United States Patent [19]

Hulyalkar

[11] Patent Number: 5,602,602
[45] Date of Patent: Feb. 11, 1997

[54] METHOD AND APPARATUS FOR COMBATING CO-CHANNEL NTSC INTERFERENCE FOR DIGITAL TV TRANSMISSION HAVING A SIMPLIFIED REJECTION FILTER

[75] Inventor: Samir N. Hulyalkar, Columbia, Md.

[73] Assignee: Philips Electronics North America Corporation, New York, N.Y.

[21] Appl. No.: 550,128

[22] Filed: Oct. 27, 1995

Related U.S. Application Data

[63] Continuation-in-part of Ser. No. 230,360, Apr. 20, 1994, Pat. No. 5,512,957, which is a continuation-in-part of Ser. No. 197,773, Feb. 10, 1994, Pat. No. 5,452,015.

[51] Int. Cl.$^6$ ..................................... H04N 5/44
[52] U.S. Cl. ........................... 348/607; 348/21; 348/409; 375/231; 375/233; 375/321; 375/350
[58] Field of Search ..................................... 348/607, 409, 348/21, 608, 726, 611, 725; 455/63, 296; 375/231, 233, 321, 350, 346; H04N 5/44, 5/38

[56] References Cited

U.S. PATENT DOCUMENTS

| | | | |
|---|---|---|---|
| 5,452,015 | 9/1995 | Hulyalkar | 348/21 |
| 5,479,449 | 12/1995 | Patel et al. | 375/321 |
| 5,506,636 | 4/1996 | Patel et al. | 348/725 |
| 5,512,957 | 4/1996 | Hulyalkar | 348/607 |
| 5,513,216 | 4/1996 | Godot et al. | 375/233 |
| 5,539,774 | 7/1996 | Nobakht et al. | 375/233 |

OTHER PUBLICATIONS

"VSB Transmission System: Technical Details", Feb. 18, 1994.
"New Automatic Equalizer Employing Modulo Arithmetic", Electronic Letters, pp. 138–139, Mar. 1971, by M. Tomlinson.
"Matched–Transmission Technique for Channels with Intersymbol Interference", IEEE Transactions on Communications, vol. COM–20, No. 4, pp. 774–780, Aug. 1972, by H. Harashima and H. Miyakawa.
Grand Alliance, "VSB Transmission System", Feb. 18, 1994, pp. 8–15, Fig. 9, 15–18.

*Primary Examiner*—John K. Peng
*Assistant Examiner*—Jeffrey Murrell
*Attorney, Agent, or Firm*—Michael E. Marion

[57] ABSTRACT

A television receiver for reducing a co-channel interference comprises a receiver for receiving a transmitted digital television signal having an encoded digital television signal component, a co-channel interference component, and a noise component, the receiver further providing a received output signal. A simplified rejection filter filters the received output signal to reduce the co-channel interference component thereof. The rejection filter comprises a simplified prediction filter having a fixed number L of tap coefficients $z_1, \ldots, z_L$, wherein the number L is less than a number N of tap coefficients for an optimal prediction filter. The optimal prediction filter corresponds to a prediction filter implemented at a television transmitter for precoding the digital television signal prior to being transmitted by the television transmitter. The rejection filter means further provides a filtered output signal. An equalizer and phase tracker is provided for operating on the faltered output signal. The equalizer and phase tracker comprises (i) a forward equalizer having an input for receiving the filtered output signal, (ii) a modified slicer responsive to an output of the forward equalizer for providing first and second modified slicer output signals and further for providing an error signal, (iii) a feedback equalizer having an input for receiving the first modified slicer output signal, and (iv) an equalizer tap-adaptation device responsive to the error signal and the inputs of the forward equalizer and feedback equalizer, respectively, for producing modified tap coefficients. The equalizer tap-adaptation device provides the modified tap coefficients to the forward and the feedback equalizers for use by the forward and feedback equalizers, respectively, in minimizing a noise enhancement effect of the noise component of the received signal. Lastly, a decoder decodes the output signal of the equalizer and phase tracker and produces a decoded digital television signal.

10 Claims, 8 Drawing Sheets

METHOD AND APPARATUS FOR COMBATING CO-CHANNEL NTSC INTERFERENCE FOR DIGITAL TV TRANSMISSION HAVING A SIMPLIFIED REJECTION FILTER

CROSS-REFERENCE TO COPENDING APPLICATIONS

This application is a continuation-in-part of U.S. patent application Ser. No. 08/230,360, filed Apr. 20, 1994, entitled "Method and Apparatus for Combating Co-channel NTSC Interference for Digital TV Transmission" now U.S. Pat. No. 5,512,957, issued Apr. 30, 1996 (attorney docket PHA 21,878), which is a continuation-in-part of Ser. No. 197,773 filed Feb. 10, 1994 now U.S. Pat. No. 5.452,015, issued Sep. 19, 1995, entitled "Method and Apparatus for Combating Co-channel NTSC Interference for Digital TV Transmission" (attorney docket PHA 21,869), both of which are assigned to the assignee of the present invention, and further, the disclosures of which are incorporated by reference herein. Another related application is copending U.S. patent application Ser. No. 08/271,810, filed Jul. 7, 1994, entitled "Method and Apparatus for Optimal NTSC Rejection Filtering and Transmitter and Receiver Comprising the Same" (attorney docket PHA 21,894), assigned to the assignee of the present invention, and further the disclosure of which is incorporated by reference herein.

BACKGROUND OF THE INVENTION

1. Field of the Invention

This invention generally relates to a method and apparatus for combating co-channel NTSC interference for digital TV transmission, and more particularly, to a receiver apparatus having a simplified rejection filter.

2. Discussion of the Related Art

The Federal Communications Commission (FCC), through its Advisory Committee on Advanced Television Service, and cable television testing organizations, such as CableLabs, have been evaluating digital television delivery systems in order to choose a new television "standard" which someday will replace NTSC in the United States. These systems all involve digital coding and data compression techniques, for example those utilizing the Motion Picture Experts Group (MPEG) algorithms or variations thereof.

The FCC plans to test and approve an advanced television (ATV) standard for terrestrial broadcasting comprising, for example, high definition television (HDTV) and standard definition (SDTV) digital signals for terrestrial broadcasting. Although the specifics of the standard are yet to be fully tested and agreed upon, the FCC has indicated that the system will initially take the form of a so called "simulcast" approach. The new HDTV signals will have to fit into currently unused television channels (so-called "taboo" channels) and initially co-exist with conventional analog television signals (NTSC) without co-channel interference.

NTSC will be used hereinafter to represent one example of conventional television broadcasting. Other examples would be SECAM and PAL. Although NTSC is exemplified herein, it is not meant to be construed as a limitation and will be used herein synonymously with "conventional" to represent conventional television in general.

In 1994, the FCC tested the so-called "Grand Alliance" system, a system which is being developed cooperatively by the corporate sponsors who were involved in a first round of individual digital proposals tested by the FCC in 1991 and 1992. This newly developed system proposes to take the best features from those systems already tested. This is being done in order to present a single optimum system for FCC approval as the U.S. standard.

The Grand Alliance has decided on a coding algorithm which will comply with the source coding standards proposed by MPEG. In addition, an RF transmission approach developed by Grand Alliance member Zenith Electronics Corporation was selected by the Grand Alliance. The RF transmission approach utilizes multi-level vestigial sideband (VSB) modulation which is described in "VSB Transmission System: Technical Details", Feb. 18, 1994.

The parent application, U.S. Ser. No. 08/230,360, filed Apr. 20, 1994, from which the instant application depends, describes an improved approach to combatting co-channel interference. The approach described in U.S. Ser. No. 08/230,360 utilizes an optimal NTSC "rejection filter" at the receiver in conjunction with an optimal precoder at the transmitter. The use of such a combination of a generalized "rejection" filter and precoder is in contrast to a use of a comb filter in a receiver as proposed by Zenith. The approach of the parent application further solves a number of problems and improves performance when both co-channel NTSC and additive white Gaussian noise (AWGN) are present. In addition, a method of using a generalized precoder and a corresponding decoder, for the case when uncoded QAM/VSB modulation is used, is described in "New Automatic Equalizer Employing Modulo Arithmetic", Electronic Letters, pp. 138–139, March 1971, by M. Tomlinson, and in "Matched-Transmission Technique for Channels With Intersymbol Interference", IEEE Transactions on Communications, vol. COM-20, no. 4, pp. 774–780, August 1972, by H. Harashima and H. Miyakawa.

While an improved overall performance of a transmitter/receiver system can be obtained when utilizing an optimal NTSC rejection filter and an associated precoder, it is however at the expense of some performance when only AWGN is present and when a co-channel NTSC spectrum is absent. This loss in performance is due to the fact that the NTSC rejection filter is implemented in the receiver at the decoder, which causes noise enhancement as a result of noise also passing through the NTSC rejection filter in the receiver.

Optimal rejection filters with the proposed constraints are disclosed in the parent application and also in U.S. patent application Ser. No. 08/271.810, filed on Jul. 7, 1994. The optimal rejection filters were designed to achieve a specific noise enhancement. From simulations, it has been determined that the filters with noise enhancement less than 0.4 dB reduce co-channel interference to a significant extent.

Noise enhancement alone, however, does not specify the overall loss in performance in AWGN. Simulations have shown that this loss in performance in AWGN could be between 0.3–0.8 dB depending on a choice of the trellis code and an amount of desired interference rejection, as disclosed for example, in the parent application of the present invention. As taught therein, when the transmitter utilizes a specific precoding, then for optimal performance, the receiver must also utilize the rejection filter for which the precoding was implemented at the transmitter. One problem with the later is that such an optimal rejection filter adds complexity in the receiver.

SUMMARY OF THE INVENTION

An object of the present invention is to reduce the complexity of the rejection filter used in a receiver while maintaining a minimal loss in overall performance.

Another object of the present invention is to provide in an HDTV system, a receiver which utilizes a rejection filter different from a rejection filter for which precoding was implemented at a transmitter of the system.

According to the present invention, a television receiver for reducing a co-channel interference comprises a means for receiving a transmitted digital television signal. The transmitted digital television signal comprises an encoded digital television signal component, a co-channel interference component, and a noise component, wherein the encoded digital television signal component is partially characterized as an N-level vestigial sideband (VSB) signal of encoded symbols. The television receiver further comprises a simplified rejection filter for filtering the received signal to reduce the co-channel interference component thereof and for providing a filtered output signal. The simplified rejection filter comprises a simplified prediction filter having a fixed number L of tap coefficients $z_1, \ldots, z_L$, wherein the number L is less than a number N of tap coefficients for an optimal prediction filter, the optimal prediction filter corresponding to a prediction filter implemented at a television transmitter for precoding the digital television signal prior to being transmitted by the television transmitter. An equalizer and phase tracker is provided for equalizing and phase tracking the filtered output signal. The equalizer and phase tracker comprises (i) a forward equalizer having an input for receiving the filtered output signal, (ii) a modified slicer responsive to an output of the forward equalizer for providing first and second modified slicer output signals and further for providing an error signal, (iii) a feedback equalizer having an input for receiving the first modified slicer output signal, and (iv) an equalizer tap-adaptation means responsive to the error signal and the inputs of the forward equalizer and feedback equalizer, respectively, for producing modified tap coefficients. The equalizer tap-adaptation means also provides the modified tap coefficients to the forward and the feedback equalizers for use by the forward and feedback equalizers, respectively, in minimizing a noise enhancement effect of the noise component of the received signal, wherein the noise enhancement effect is produced as a result of the filtering of the received signal by the rejection filter. The equalizer and phase tracker further provide an equalized and phased tracked output signal corresponding to the second modified slicer output signal. Lastly, a decoder, responsive to the equalized and phase tracked output signal, produces a decoded digital television signal.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings in which like reference numerals are carried forward, and in which.

DETAILED DESCRIPTION OF THE PREFERRED EMBODIMENTS

Figure 1:
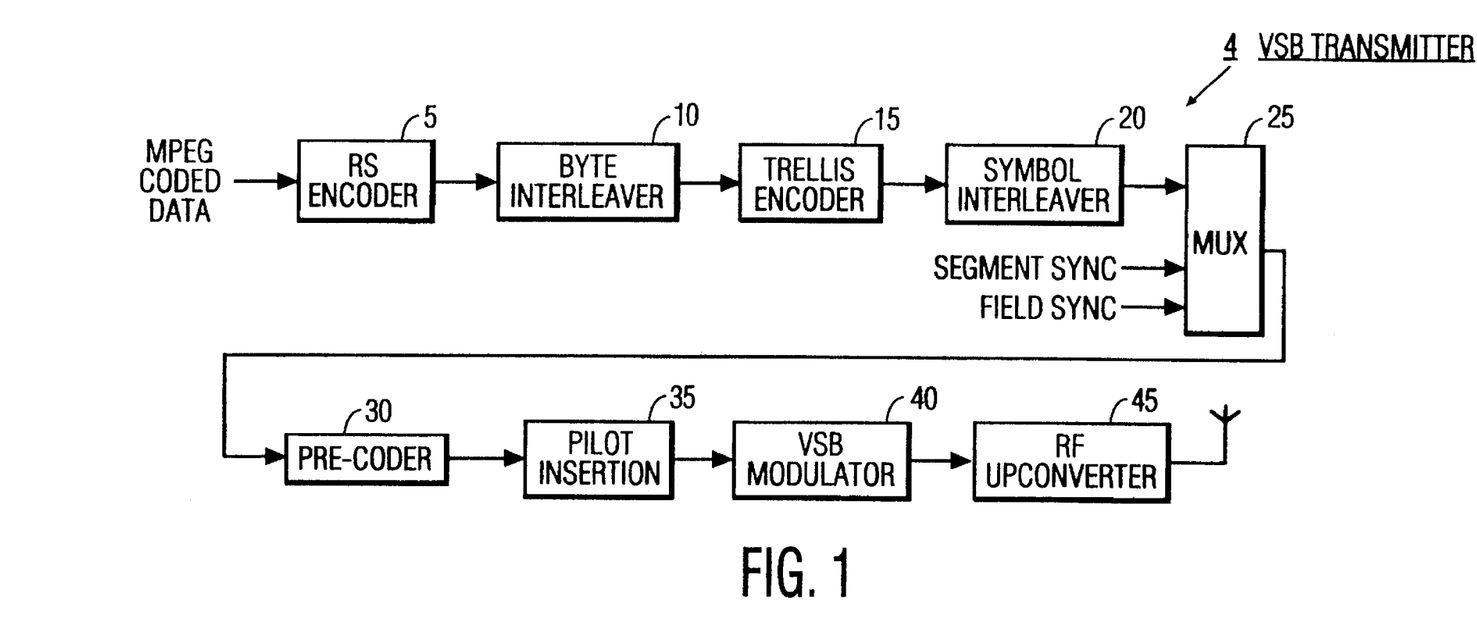
FIG. 1 shows a block diagram of a VSB transmitter, as disclosed in the parent application.

Referring now to FIG. 1, a VSB HDTV transmitter 4 comprising an encoding/transmission system, as disclosed in the parent application, is shown in block diagram form. Such a transmitter operates to transmit an encoded digital television signal. That is, digital data (for example, comprising MPEG encoded television) is passed through a Reed-Solomon (RS) encoder 5, a byte interleaver 10, a trellis encoder 15. and a symbol interleaver 20. The output of the symbol interleaver 20 is passed through a multiplexer (MUX) 25. MUX 25 also multiplexes any training signals, for example, segment sync or field sync symbols, that are present in accordance to a particular sequence being transmitted. The blocks 5, 10, 15, 20, and 25 are known in the art, such as described in "VSB Transmission System: Technical Details", for example, and thus only briefly discussed herein.

The output of MUX 25 comprises a multiplexed data stream which is then sent through a precoder 30. Precoder 30 precodes the data stream, thus providing a precoded output data stream at its output. Precoder 30 is further discussed in detail hereinafter with respect to FIG. 4. The precoded output is then passed through a pilot insertion means 35. The output of the pilot insertion means 35 is then passed through a VSB modulator 40, and lastly, a radio frequency (RF) upconverter 45. RF upconverter 45 upconverts the digital television signal input thereto and causes the digital television signal to be radiated over a predetemfined HDTV terrestrial channel. Pilot insertion means 35, VSB modulator 40, and RF upconverter 45 are also known in the art, as described for example in "VSB Transmission System: Technical Details", and thus only briefly discussed herein.

Figure 2:
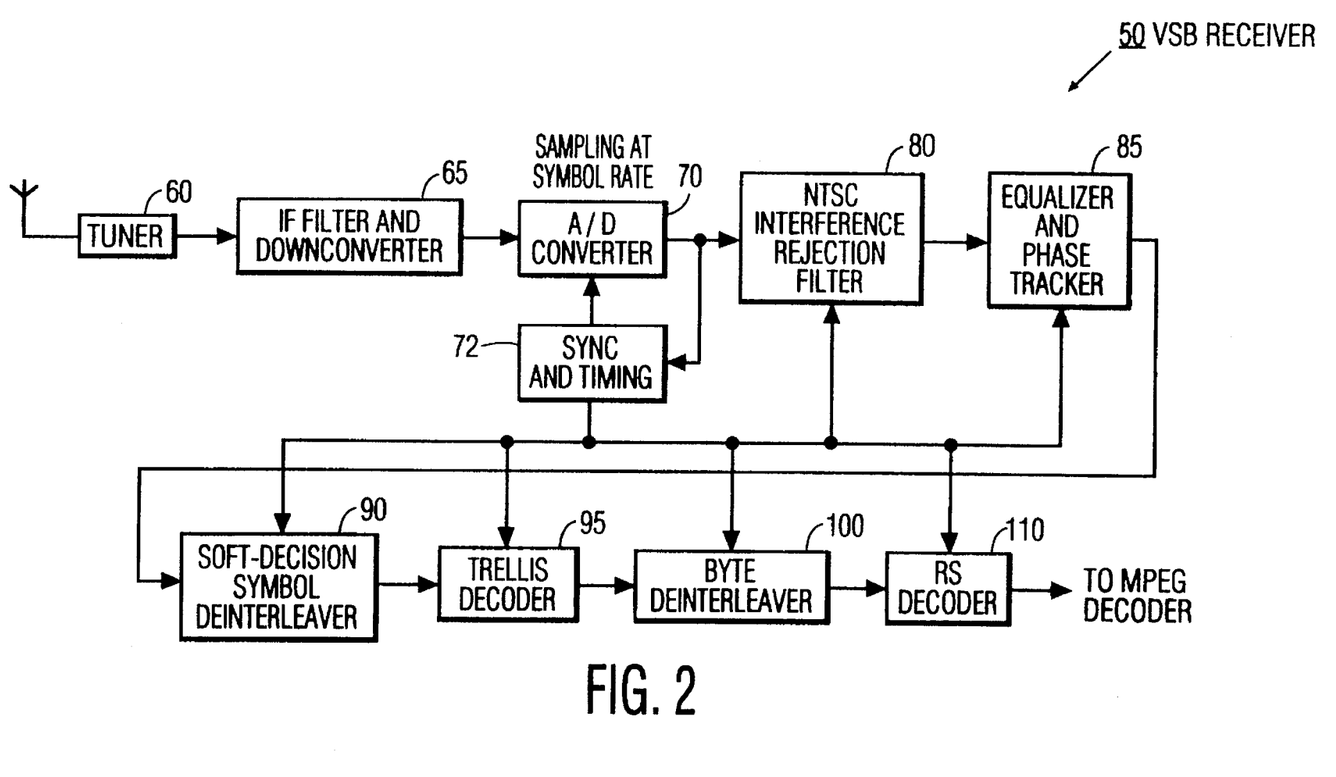
FIG. 2 shows a VSB receiver, as disclosed in the parent application.

Turning now to FIG. 2, a VSB receiver 50 is shown in block diagram form. Receiver 50 comprises a tuner 60 which selects an HDTV channel of interest and converts a received signal from RF to intermediate frequency (IF). The received signal (i.e., the output of tuner 60) is sent to an IF filter and downconverter 65. IF filter and downconverter 65 comprises an IF filter to filter, i.e., shape, the signal spectrum of the received signal according to the filter used in the VSB modulator 40 of transmitter 4. IF filter and downconverter 65 further comprises a mixer which downconverts the filtered signal into a baseband signal. The blocks 60 and 65 are known in the art and thus only briefly discussed herein. Referring still to FIG. 2, an analog-to-digital (A/D) converter 70 samples the output signal of IF filter and downconverter 65 at a desired symbol-rate, for example, 10.76 MHz. The output of the A/D converter is passed through an NTSC rejection filter 80, as will be described in more detail with respect to FIG. 3. The output of rejection filter 80 is then passed to an input of equalizer and phase tracker 85, the later of which will be described in more detail with respect to FIG. 5. The equalizer and phase tracker output is passed through a soft-decision symbol deinterleaver 90, a trellis-decoder 95, a byte deinterleaver 100, and an RS decoder 110. Symbol deinterleaver 90, trellis-decoder 95, byte deinterleaver 100, and RS decoder 110 are known in the art, as described for example in "VSB Transmission System: Technical Details", and thus only briefly discussed herein. A synchronizing and timing block 72 controls a clocking for each of the digital signal processing blocks (as indicated in FIG. 2) and also the A/D converter 70.

Figure 3:
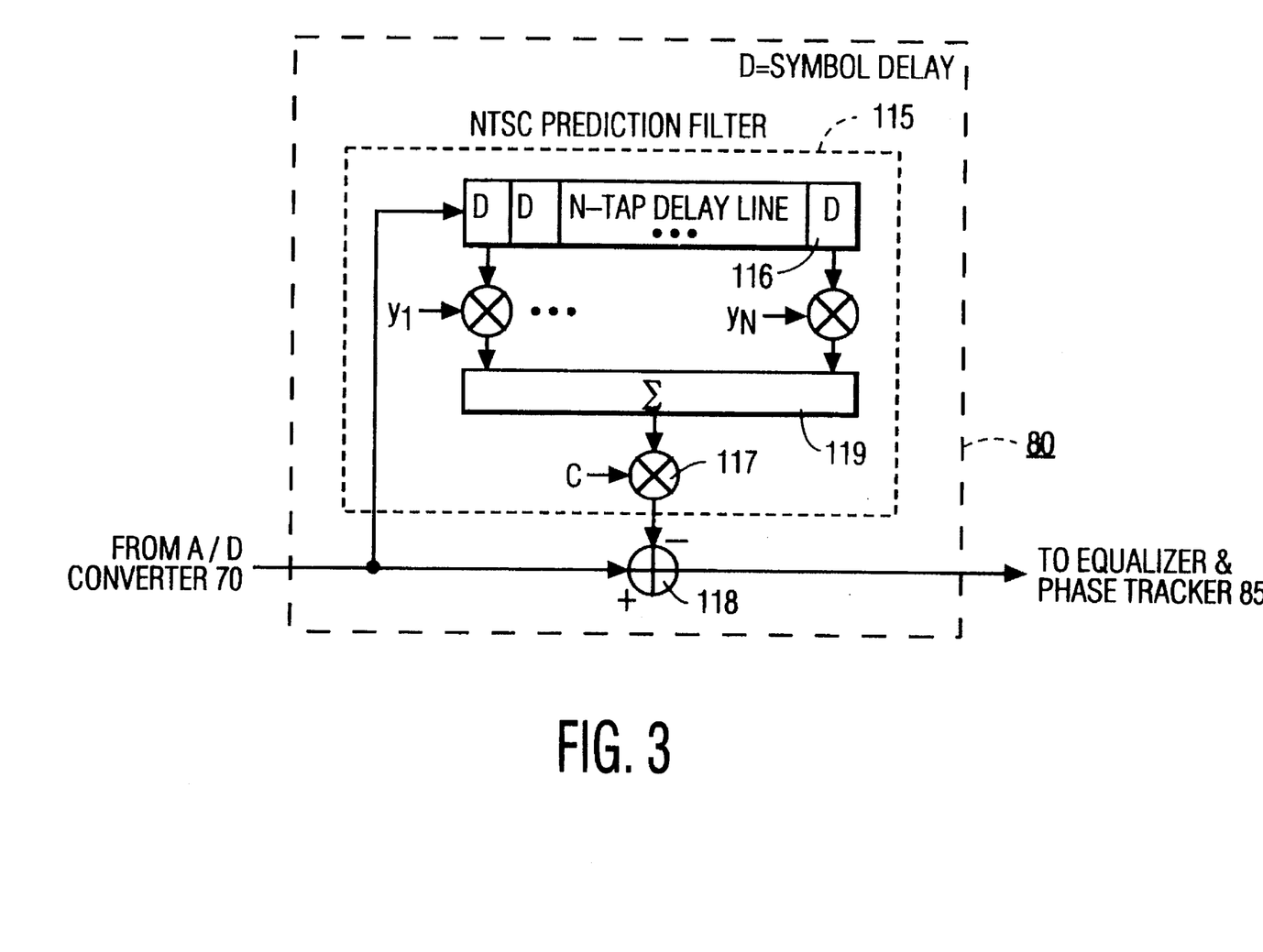
FIG. 3 shows an optional NTSC interference rejection filter, as disclosed in the parent application.

Referring now to FIG. 3, the NTSC interference rejection filter 80 will now be described in further detail. Rejection filter 80 comprises an NTSC prediction filter 115. Prediction filter 115 provides estimates on deterministic parts of an interfering NTSC signal, the deterministic parts corresponding, to a reasonable extent, to the region around a picture and an audio carrier of the interfering NTSC signal. An output of prediction filter 115 is subtracted out of a main signal by using a subtracter 118. The NTSC prediction filter 115 further comprises an N-tap delay line 116, wherein each delay D is equal to one symbol interval. One symbol interval is equivalent to the reciprocal of the A/D sampling rate of 10.76 MHz.

Referring still to FIG. 3, the outputs of each of the symbol delays of the N-tap delay line 116 are multiplied by respective filter tap-coefficients $y_1, \ldots, y_N$. The outputs of the delay line 116 times the respective filter tap-coefficients $y_1, \ldots, Y_N$ are then summed by summation block 119. After summing the outputs of the delay line times the coefficients of the filter $y_1, y_2, \ldots, y_N$, a final scaling constant C, operating on the sum in multiplier 117, provides the output of the NTSC prediction filter 80. The design of the prediction filter 80, including the manner of determining the coefficients and the scaling constant C, is treated in further detail in the parent application, as well as in U.S. patent application Ser. No. 08/271,810. As discussed in the parent application, a precoder 30 must be implemented in the transmitter 4 if a signal is to be processed by the NTSC rejection filter 80.

Figure 4:
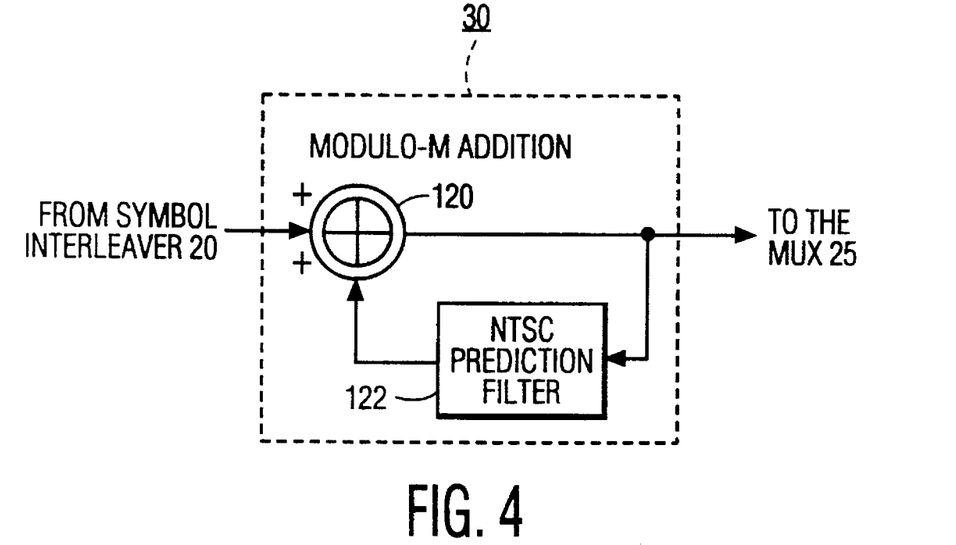
FIG. 4 shows a precoder utilized at a transmitter, as disclosed in the parent application.

Turning now to FIG. 4, precoder 30, as used in the transmitter 4, will be described in further detail. In precoder 30, the output of the symbol interleaver 20 is passed through a modulo-M adder 120, which adds its output passed through an NTSC prediction filter 122. That is, the output of modulo-M adder 120 is passed through NTSC prediction filter 122 and added to the input of the modulo-M adder 120. The operation of a modulo-M adder is known in the art, for example, as described in "New Automatic Equalizer Employing Modulo Arithmetic", Electronic Letters, pages 138–139, in March 1971, and thus only briefly discussed herein. In addition, the value of M is chosen to be greater than or equal to a peak value of the incoming symbol. NTSC prediction filter 122 comprises a NTSC prediction filter for implementing a desired precoding at the transmitter, for example, an NTSC prediction filter similar to prediction filter 115, or other comparable prediction filter. Prediction filter 115 is discussed above with reference to FIG. 3. As mentioned herein above with respect to the method and apparatus of the parent application, prediction filters 115 and 122, in the receiver and the transmitter, respectively, comprise similar NTSC prediction filters.

In accordance with the present invention, for a rejection filter designed with less than 0.4 dB noise enhancement, the energy of tap-coefficients of the rejection filter for other than a main tap, as compared to an energy associated with the main tap, is −10.2 dB. It is thus possible for an equalizer to determine the value of the tap-coefficients, as will be explained further herein below. Furthermore, according to the present invention, instead of implementing the optimal rejection filter in the receiver, the receiver comprises a simplified rejection filter which requires an equalization to be done in a particular way, as is also described further herein below. Depending on a choice of the optimal rejection filter for which precoding is used at a transmitter and a proper choice of the simplified rejection filter, a minimal loss in overall performance is expected. The present invention thus introduces only a minimal loss in overall performance, while at the same time advantageously reducing a complexity of the rejection filter at the receiver.

Further in accordance with the present invention, a simplified rejection filter is used at the receiver instead of an optimal rejection filter, when precoding using the optimal rejection filter is implemented at the transmitter. The simplified rejection filter implementation relies on an equalization to be done in a special way by performing a prescribed modulo-reduction at the receiver.

Figure 5:
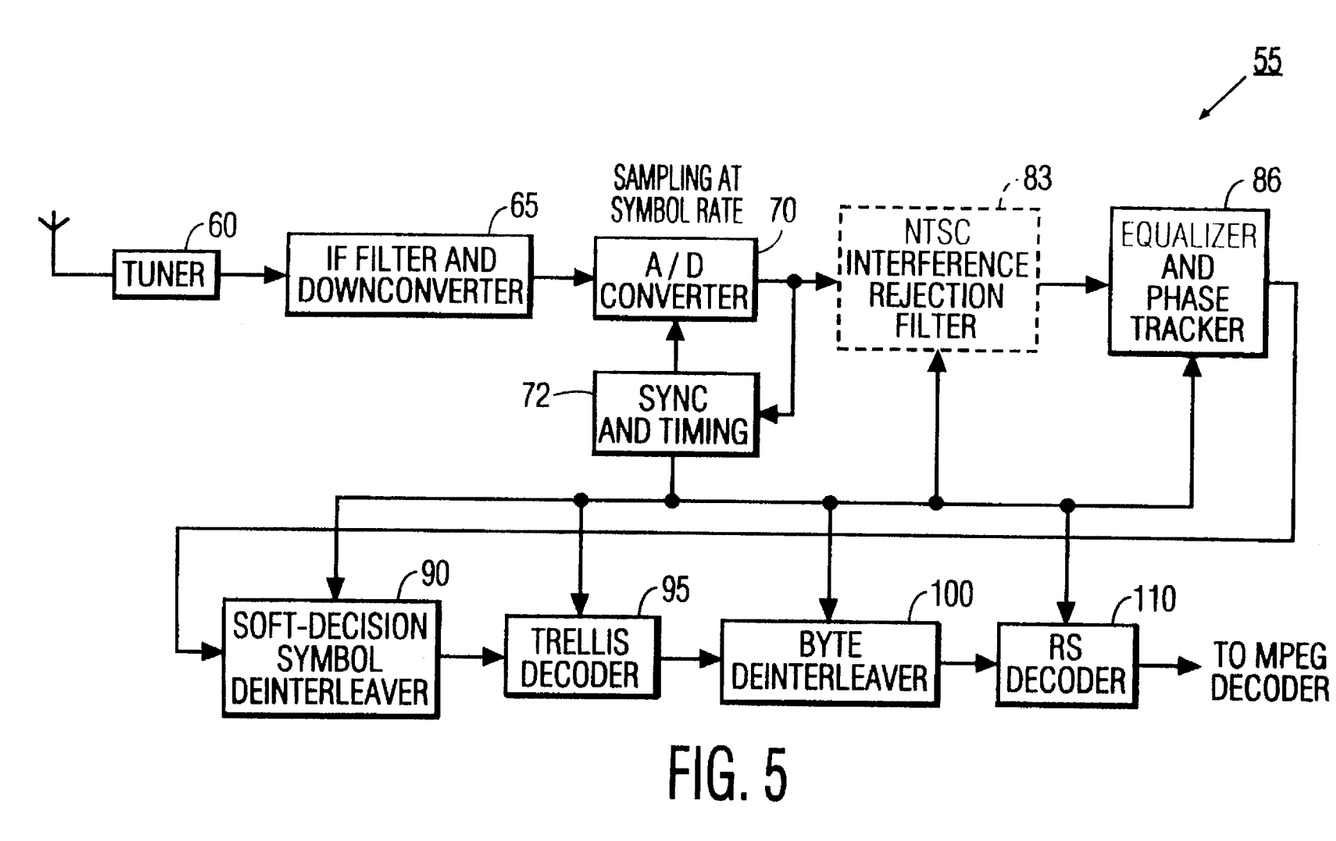
FIG. 5 shows a VSB receiver having a simplified rejection filter in accordance with the present invention.

Referring now to FIG. 5, the VSB receiver 55 in accordance with the present invention is shown in block diagram form. The VSB receiver 55 of FIG. 5 is similar to the VSB receiver 50 of FIG. 2. except for the following differences in which a rejection filter 83 having a simplified prediction filter is used at the receiver in conjunction with a particular equalizer and phase tracker 86. The rejection filter 83 for reducing co-channel interference will be described herein below with respect to FIG. 6. The equalizer and phase tracker 86 for implementing a particular equalization will be described with respect to FIG. 8.

Figure 6:
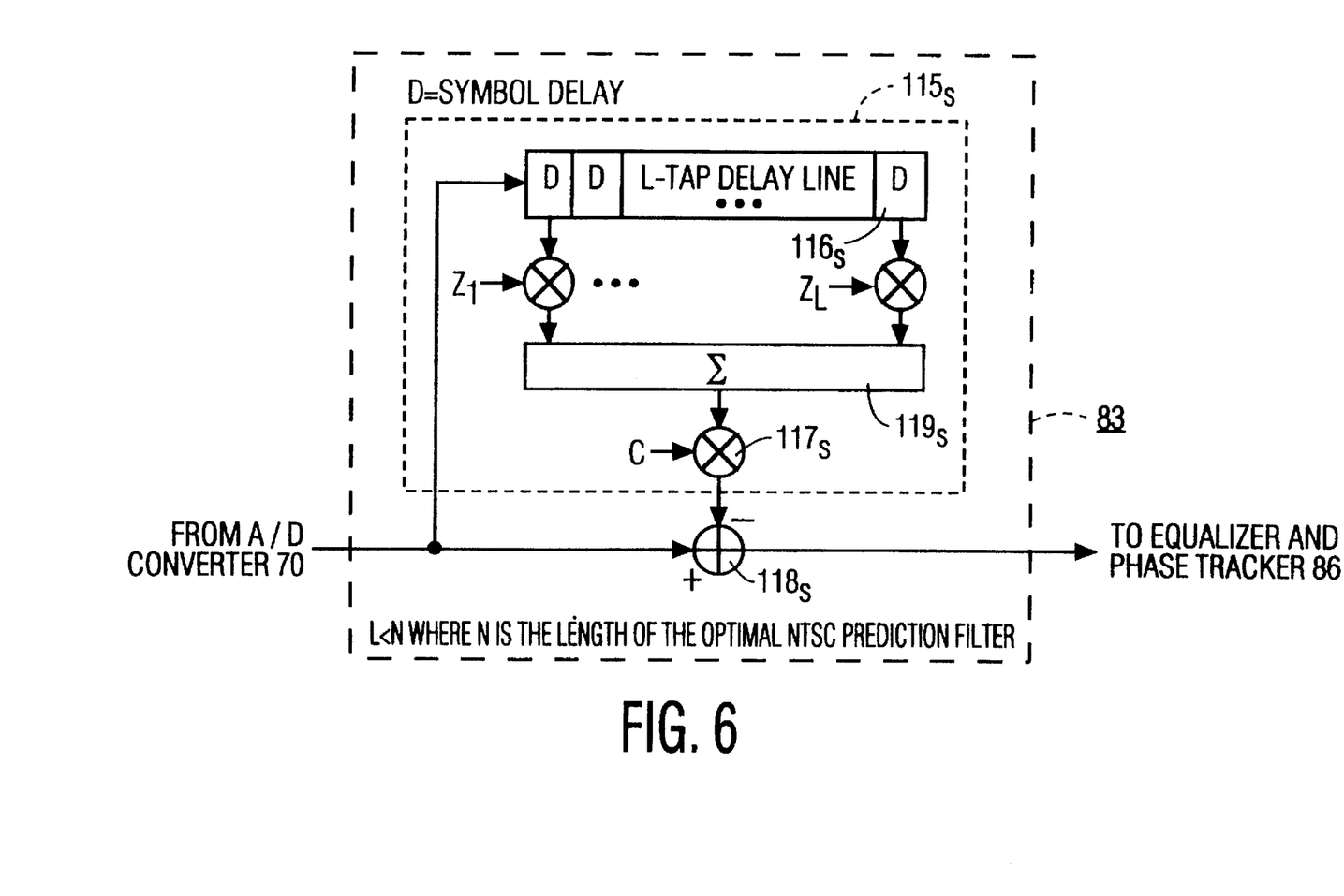
FIG. 6 shows a simplified rejection filter in accordance with the present invention.

The rejection filter 83, in accordance with the present invention, comprises a rejection filter having fewer tap-coefficients than that of the optimal NTSC rejection filter 80 (i.e., L<N). Simplified rejection filter 83 comprises an NTSC prediction filter $115_s$. Prediction filter $115_s$ provides estimates on deterministic parts of an interfering NTSC signal, the deterministic parts corresponding, to a reasonable extent, to the region around a picture and an audio carrier of the interfering NTSC signal. An output of prediction filter $115_s$ is subtracted out of a main signal by using a subtracter $118_s$. The NTSC prediction filter $115_s$ further comprises an L-tap delay line $116_s$, wherein each delay D is equal to one symbol interval. One symbol interval is equivalent to the reciprocal of the A/D sampling rate of 10.76 MHz.

Referring still to FIG. 6, the outputs of each of the symbol delays of the L-tap delay line $116_s$ are multiplied by respective filter tap-coefficients $z_1, \ldots, z_L$. The outputs of the delay line $116_s$ times the respective filter tap-coefficients $z_1, \ldots, z_L$ are then summed by summation block $119_s$. After summing the outputs of the delay line times the coefficients of the filter $z_1, \ldots, z_L$, a final scaling constant C, operating on the sum in multiplier $117_s$, provides the output of the simplified NTSC prediction filter 83. The design of the simplified prediction filter 83 is similar to that of the optimal prediction filter 80, including the manner of determining the coefficients and the scaling constant C, however, tap-coefficients $z_1, \ldots, z_L$ of the simplified rejection filter 83 may be different from those tap-coefficients $y_1, \ldots, y_N$ of the optimal rejection filter 80.

At this point, let us consider what happens for an extreme case when no rejection filter is used at the receiver (i.e. all tap-coefficients $z_1, \ldots, z_L$ have values equal to zero). We define the rejection filter transfer function H(z) as:

$$H(z) = 1 + h_1 z^{-1} + h^2 z^{-2} + \ldots + h_N z^{-N}, \text{tm (EQ1)}$$

where $h_{i=C_{y^i}}$, for i=1, . . . ,N and C is the scaling constant. If no rejection filter is used, then the equalizer and phase tracker must compensate for an "equivalent" filter produced because of the precoding with the filter response given by 1/H(z). By design, H(z) has no zeroes, which implies that 1/H(z) will not be unstable. If the filter H(z) is designed with a noise enhancement less than 0.4 dB, then the output power of a signal passing through the optimal rejection filter, when a signal having unit power is input to the filter, is given by:

$$10 \log (h_1^2+ \ldots +h_N^2)=-10.2 \text{ db}. \quad \text{(EQ2)}$$

This implies that not only is 1/H(z) stable, its coefficients have significant values only for the first L taps (L<N), since tile higher powers of $h_i$ are really small and therefore can be ignored. Thus, in accordance with the present invention, the simplified rejection filter is designed having only the first L taps. The equalizer will compensate when the non-optimal simplified rejection filter is used, wherein the equalizer converges to the ignored rejection filter taps. In an extreme case, the equalizer may be able to converge even if there is no rejection filter at the receiver; however, care must be taken not to overload the equalizer since the equalizer must compensate for the channel filter.

Figure 7:
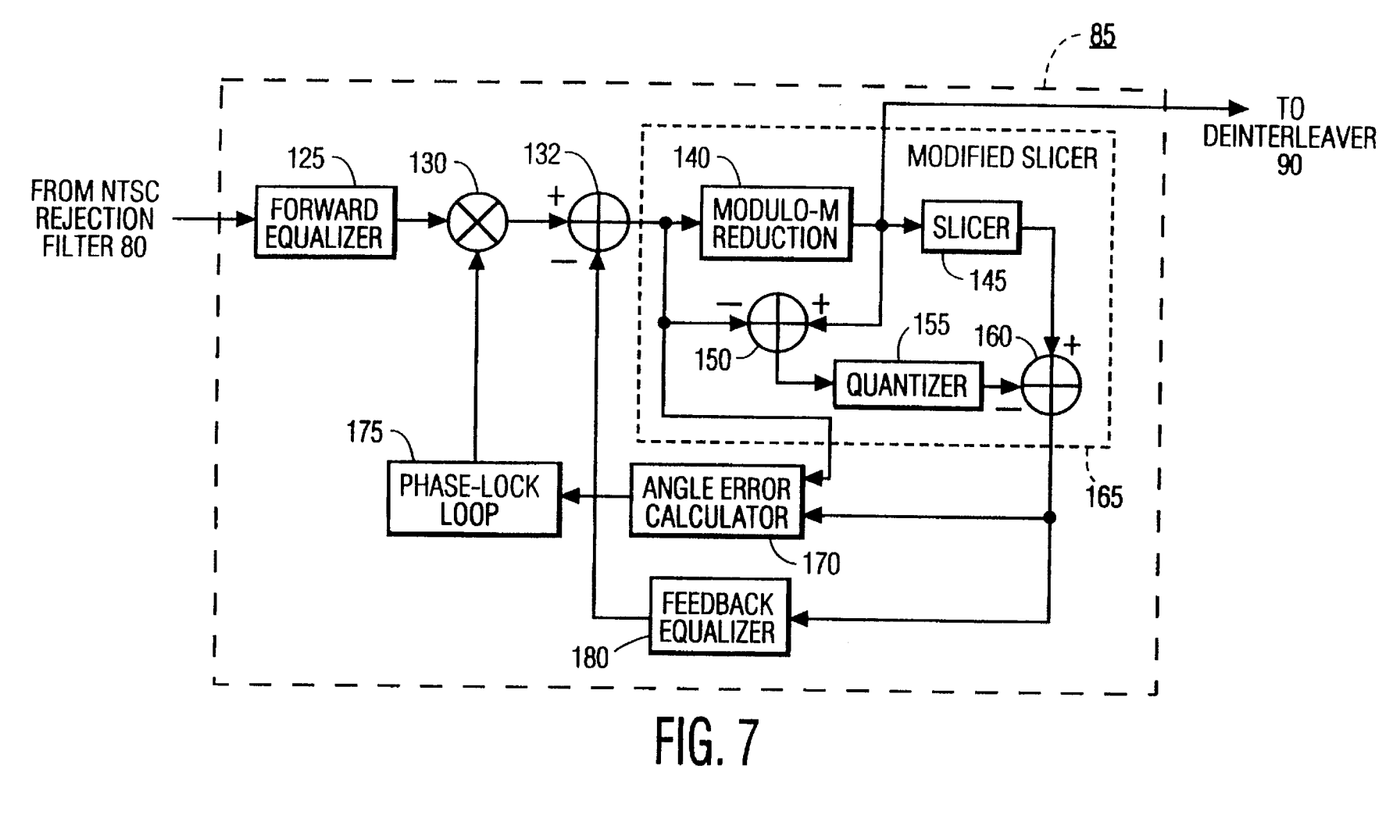
FIG. 7 shows an equalizer and phase tracker as disclosed in the parent application.

In FIG. 7, equalizer and phase tracker 85 of receiver 50 (FIG. 2) is shown in greater detail, as also described in the parent application. Briefly, an output of the NTSC rejection filter 80 is passed through a forward equalizer 125, the phase offset of which is removed using a multiplier 130. Multiplier 130 is fed a phase offset value from an angle-error calculator 170 and a phase-lock-loop 175. The output of the multiplier 130 has residual intersymbol interference introduced by the selected HDTV channel, the residual intersymbol interference being removed through the use of a feedback equalizer 180. Both the feedback equalizer 180 and the angle-error calculator 170 are passed the outputs of a "modified" slicer 165. The "modified" slicer 165 is a result of pre-coding at the transmitter 4 (FIG. 1). In effect, if the modified slicer 165 replaces the slicer in the usual case of no pre-coding, then the entire equalizer and the phase tracker description is the same as described, for example, in "Digital Communication", by E. A. Lee and D. G. Messerschmitt, published by Kluwer Academic Publishers in 1988.

The modified slicer 165 (FIG. 7) can be described as follows. The input to the modified slicer 165 passes through a modulo-M reduction circuit 140, which simply rescales the input so that the input lies within certain levels. The slicer 145 then operates on a symbol constellation which is the output of the trellis encoder 15. The input and output of the modulo-M reduction circuit is passed through a subtracter 150, which is then passed through a quantizer 155. Finally the output of the slicer 145 and the output of the quantizer 155 are passed through a subtracter 160, which forms the output of the modified slicer 165. The output of tile modulo-M reduction circuit 140 is sent to the soft-decision symbol deinterleaver 90 and then the trellis decoder 95 as shown in FIGS. 2 and 7. Other implementations of the equalizer and the phase tracker are also possible, on the condition that all of the implementations must have the fuctionality implied by the modified slicer 165 as part of the circuit.

Further in accordance with the present invention, an equalization is simplified as a result of a training sequence or a field sync, for example, as is presence in a received HDTV signal, or as provided by a training sequence generator. Such a training sequence or a field sync is sent by the Grand Alliance VSB transmission scheme as described in "VSB Transmission System: Technical Details". The training sequence provides the receiver with a reference which can then be used to train the equalizer in an initial training period. However, for the trained equalization to work in this case, an essential modulo-reduction operation must be conducted on an output of the equalizer before the equalizer output is compared to tile training sequence.

Figure 8:
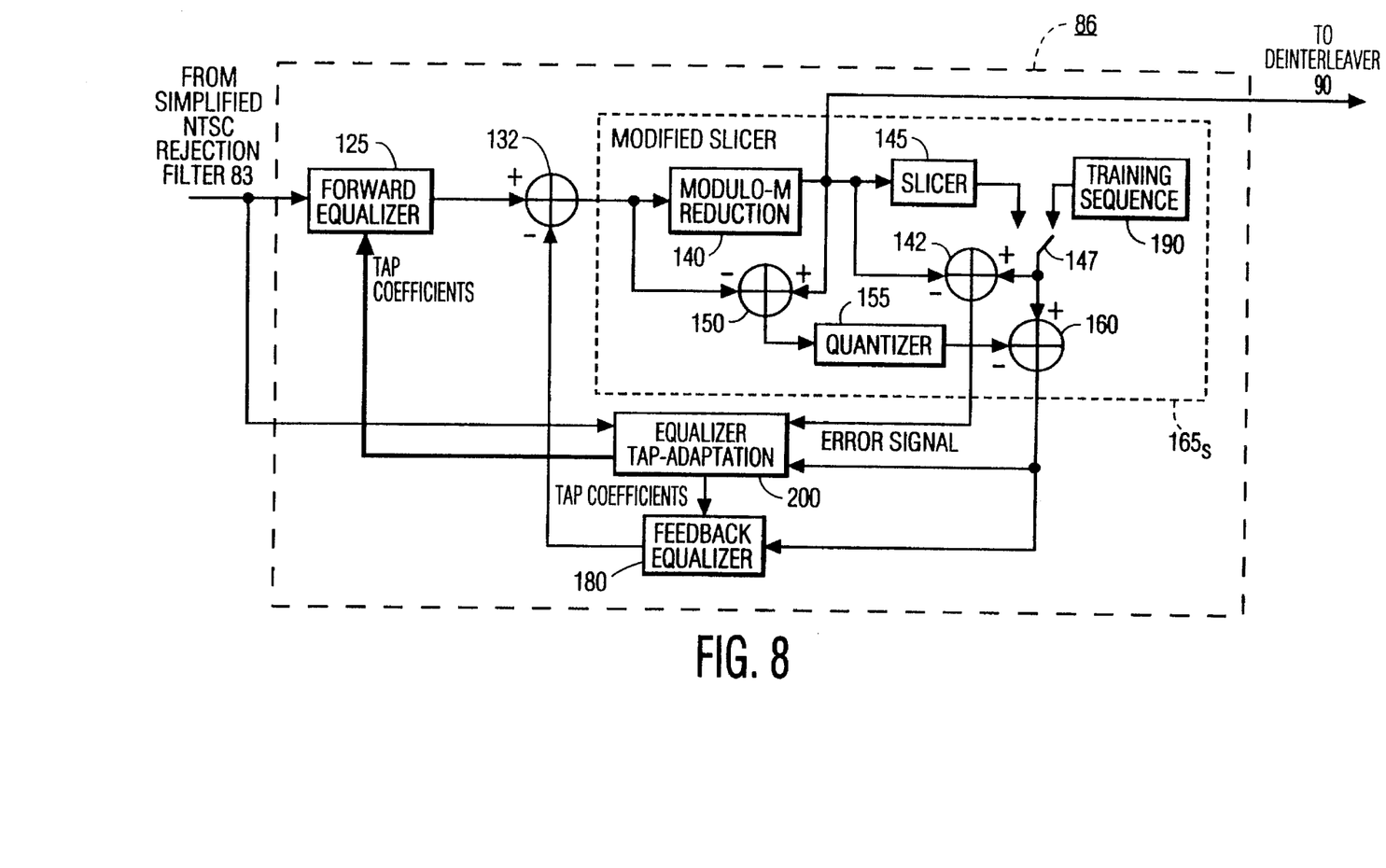
FIG. 8 shows an equalizer and phase tracker, comprising an equalizer tap-adaptation means, in accordance with the present invention.

Turning now to FIG. 8, equalizer and phase tracker 86 in accordance with the present invention is shown. Equalizer and phase tracker 86 is similar to equalizer and phase tracker 85 of FIG. 7 with the following exceptions, as will be explained herein below. For simplicity, the phase tracker comprising the angle error calculator 170 and the phase-lock loop 175 of FIG. 7 is not shown in FIG. 8 but is to be understood as being included in equalizer and phase tracker 86 according to the present invention. An output of feedback equalizer 180 is subtracted from an output of forward equalizer 125 via subtracter 132, wherein the output of subtracter 132 is then input to the modified slicer $165_s$, similarly as described above with respect to FIG. 7. Modified slicer $165_s$ is similar to modified slicer 165 of FIG. 7 and further includes a training sequence means 190 for providing a training sequence during a training period. Modified slicer $165_s$ selectively outputs, via a controllable switch 147, either (i) an output of training sequence means 190 during a training period or (ii) an output of slicer 145 when data is received.

Equalizer and phase tracker 86 further comprises an equalizer tap-adaptation means 200 for implementing an equalizer tap-adaptation algorithm, the equalizer tapadaptation algorithm producing modified taps (i.e., tap-coefficients) to be used by the forward and feedback equalizers 125 and 180, respectively. Equalizer tap-adaptation means 200 provides modified taps in response to respective inputs of the forward and feedback equalizers 125 and 180, respectively, further in addition to an input in the form of an error signal. Equalizer tap-adaptation means 200 utilizes a difference between an output of the modulo-M reduction block 140 and an output of either (i) the slicer 145 or (ii) the training sequence means 190 as an error signal in modifying the taps of the forward and the feedback equalizers 125 and 180, respectively, as shown. For purposes of generating the error signal, modified slicer 165 further comprises a subtracter 142, in which the output of modulo-M reduction block 140 is connected to the minus input of subtracter 142. In addition, the output of switch 147 is connected to the plus input of subtracter 142. wherein a desired input of switch 147, i.e., either the output of slicer 145 or the training sequence output of means 190, is provided to subtracter 142, as appropriate, for use in generating the error signal input of equalizer tap-adaptation means 200. The equalizer tap-adaptation algorithm of means 200 thus operates upon the error signal and the respective inputs of the forward and feedback equalizers for producing modified taps (i.e., tap-coefficients) to be used by the forward and feedback equalizers 125 and 180, respectively. Use of such modified taps or tapcoefficients in equalizer and phase tracker 86, in conjunction with the simplified rejection filter 83, advantageously yield an acceptable overall performance in receiver 4 with a minimal complexity.

Equalizer tap-adaptation means 200 preferably comprises a tap-adaptation circuit which operates on a least-means-squares algorithm, such as is described for example in "Digital Communication", by E. A. Lee and D. G. Messerschmitt, published by Kluwer Academic Publishers in 1988. While the tap-adaptation circuit operates on an LMS algorithm, other tap-adaptation circuits can also be used. A significant aspect of the receiver of the present invention is the use of the simplified rejection filter 83 in conjunction with the equalizer and phase tracker 86, and more particularly, in the manner in which the error-signal for adapting the taps is generated.

The television receiver according to the present invention thus effectively reduces co-channel interference. The present invention further introduces only a minimal loss in overall performance, while at the same time advantageously reducing a complexity of the rejection filter at the receiver.

While the invention has been particularly shown and described with reference to the preferred embodiment thereof, it will be understood by those skilled in the art that various changes in form and detail may be made therein without departing from the spirit and scope of the invention.

What is claimed is:

1. A television receiver for reducing a co-channel interference comprising:

means for receiving a transmitted digital television signal, the transmitted digital television signal having an encoded digital television signal component, a co-channel interference component, and a noise component, wherein the encoded digital television signal component is partially characterized as an N-level vestigial sideband (VSB) signal of encoded symbols, said receiver means further providing a received output signal;

simplified rejection filter means for filtering the received output signal to reduce the co-channel interference component thereof, wherein said rejection filter means comprises a simplified prediction filter having a fixed number L of tap coefficients $z_1, \ldots, z_L$, further wherein the number L is less than a number N of tap coefficients for an optimal prediction filter, the optimal prediction filter corresponding to a prediction filter implemented at a television transmitter for precoding the digital television signal prior to being transmitted by the television transmitter, said rejection filter means further providing a filtered output signal;

means for equalizing and phase tracking the filtered output signal, wherein said equalizer and phase tracker means comprises (i) a forward equalizer having an input for receiving the filtered output signal, (ii) a modified slicer responsive to an output of the forward equalizer for providing first and second modified slicer output signals and further for providing an error signal, (iii) a feedback equalizer having an input for receiving the first modified slicer output signal, and (iv) an equalizer tap-adaptation means responsive to the error signal and the inputs of the forward equalizer and feedback equalizer, respectively, for producing modified tap coefficients, the equalizer tap-adaptation means further for providing the modified tap coefficients to the forward and the feedback equalizers for use by the forward and feedback equalizers, respectively, in minimizing a noise enhancement effect of the noise component of the received signal, wherein the noise enhancement effect is produced as a result of the filtering of the received signal by said rejection filter means, said equalizer and phase tracker means further providing an equalized and phased tracked output signal corresponding to the second modified slicer output signal;

means responsive to the equalized and phase tracked output signal for producing a decoded digital television signal.

2. The television receiver of claim 1, wherein the simplified prediction filter of said rejection filter means is responsive to the received signal for providing a predicted output signal, further wherein the simplified prediction filter comprises (i) an L-tap delay line of delays D, wherein each delay D is equal to one symbol interval, one symbol interval being equivalent to a reciprocal of an A/D sampling rate of said receiver means, (ii) a plurality of multiplication means for multiplying respective outputs of each delay of the L-tap delay line by respective filter tap-coefficients $z_1, \ldots, z_L$, (iii) summation means for summing the multiplied outputs and providing a summed output, and (iv) further multiplication means for multiplying the summed output by a final scaling constant C to provide the predicted output of the simplified prediction filter, and wherein said rejection filter means further comprises a subtracter for subtracting the predicted output signal of the simplified prediction filter from the received signal.

3. The television receiver of claim 2, wherein time tap-coefficients $z_1, \ldots, z_L$ of the simplified rejection filter are different from tap-coefficients $y_1, \ldots, y_N$ of the optimal rejection filter.

4. The television receiver of claim 1, wherein time modified slicer of said equalizer and phase tracker means further comprises (i) a Modulo-M reduction circuit having an input and an output, (ii) a slicer having an input connected to the output of the Modulo-M reduction circuit, the slicer further having an output, (iii) means for generating a training sequence, the training sequence generating means having an output, and (iv) error signal generating means for generating the error signal, wherein the error signal comprises (a) in a non-training mode, a difference between the output of the Modulo-M reduction circuit and the output of the slicer, and (b) in a training mode, a difference between the output of the Modulo-M reduction circuit and the output of the training sequence generating means.

5. The television receiver of claim 4, further wherein the error signal generating means further comprises a subtracter having a minus input and a plus input, the minus input being connected to the output of the modulo-M reduction circuit, and switch means for selectively switching (a) in the non-training mode, the output of the slicer to the plus input of the subtracter, and (b) in the training mode, the output of the training sequence generator means to the plus input of the subtracter.

6. A television receiver for reducing a co-channel interference of a preceded television signal which is transmitted by a transmitter over a selected channel, the transmitter utilizing a precoder for precoding the television signal, the precoder having an optimal prediction filter wherein the optional prediction filter comprises a number N of tap coefficients, the television signal further having an encoded digital television signal component, a co-channel interference component, and a noise component, wherein the encoded digital television signal component is partially characterized as an N-level vestigial sideband (VSB) signal of encoded symbols, said receiver comprising:

channel receiving means for receiving the precoded television signal on the selected channel; simplified rejection filter means for filtering the received signal to reduce the co-channel interference component thereof, wherein said rejection filter means comprises a simplified prediction filter having a fixed number L of tap coefficients $z_1, \ldots z_L$, further wherein the number L is less than the number N of tap coefficients for the optimal prediction filter, said rejection filter means further for providing a filtered output signal;

means for equalizing and phase tracking the filtered output signal, wherein said equalizer and phase tracker means comprises (i) a forward equalizer having an input for receiving a filtered output signal, (ii) a modified slicer, responsive to an output of the forward equalizer for providing first and second modified slicer output signals and further for providing an error signal, (iii) a feedback equalizer having an input for receiving the first modified slicer output signal, and (iv) an equalizer tap-adaptation means, responsive to the error signal and the inputs of the forward equalizer and feedback equalizer, respectively, for producing modified tap coefficients, the equalizer tap-adaptation means further for providing the modified tap coefficients to the forward equalizer and the feedback equalizer for use by the forward and feedback equalizers, respectively, in minimizing a noise enhancement effect of the noise component of the received signal, wherein the noise enhancement effect is produced as a result of the filtering of the received signal by said rejection filter means, said equalizer and phase tracker means further for providing an equalized and phase tracked output signal corresponding to the second modified slicer output signal;

trellis decoding means for trellis decoding the equalizer and phase tracker output signal;

byte de-interleaving means for byte de-interleaving the trellis decoded output signal; and decoder means for decoding the byte de-interleaved output signal and for producing a decoded digital television signal.

7. The television receiver of claim 6, wherein the simplified prediction filter of said rejection filter means is responsive to the received signal for providing a predicted output signal, further wherein the simplified prediction filter comprises (i) an L-tap delay line of delays D, wherein each delay D is equal to one symbol interval, one symbol interval being equivalent to a reciprocal of an A/D sampling rate of said receiver means, (ii) a plurality of multiplication means for multiplying respective outputs of each delay of the L-tap delay line by respective filter tap-coefficients $z_1, \ldots, z_L$, (iii) summation means for summing the multiplied outputs and providing a summed output, and (iv) further multiplication means for multiplying the summed output by a final scaling constant C to provide the predicted output of the simplified prediction filter, and wherein said rejection filter means further comprises a subtracter for subtracting the predicted output signal of the simplified prediction filter from the received signal.

8. The television receiver of claim 7, wherein the tap-coefficients $z_1, \ldots, z_L$ of the simplified rejection filter are different from tap-coefficients $y_1, \ldots, Y_N$ of the optimal rejection filter.

9. The television receiver of claim 6, wherein the modified slicer of said equalizer and phase tracker means further comprises (i) a Modulo-M reduction circuit having an input and an output, (ii) a slicer having an input connected to the output of the Modulo-M reduction circuit, the slicer further having an output, (iii) means for generating a training sequence, the training sequence generating means having an output, and (iv) error signal generating means for generating the error signal, wherein the error signal comprises (a) in a non-training mode, a difference between the output of the Modulo-M reduction circuit and the output of the slicer, and (b) in a training mode, a difference between the output of the Modulo-M reduction circuit and the output of the training sequence generating means.

10. The television receiver of claim 9, further wherein the error signal generating means further comprises a subtracter having a minus input and a plus input, the minus input being connected to the output of the modulo-M reduction circuit, and switch means for selectively switching (a) in the non-training mode, the output of the slicer to the plus input of the subtracter, and (b) in the training mode, the output of the training sequence generator means to the plus input of the subtracter.

\* \* \* \* \*